United States Patent [19]

Morita et al.

[11] Patent Number: 5,219,134
[45] Date of Patent: Jun. 15, 1993

[54] CORD CLAMP

[75] Inventors: Katsuyuki Morita, Nagoya; Kazuaki Nashida, Iwai, both of Japan

[73] Assignee: Kitagawa Industries Co., Ltd., Japan

[21] Appl. No.: 790,395

[22] Filed: Nov. 7, 1991

[30] Foreign Application Priority Data

Nov. 8, 1990 [JP] Japan .................................. 2-118019

[51] Int. Cl.$^5$ ............................................... F16L 3/00
[52] U.S. Cl. ..................................... 248/73; 248/224.3; 248/291
[58] Field of Search ..................... 248/73, 221.3, 222.1, 248/224.3, 65, 229, 231.9, 50, 51, 291, 289.1, 514; 403/92, 93, 97, 98

[56] References Cited

U.S. PATENT DOCUMENTS

| 2,613,051 | 10/1952 | Baum | 248/50 |
| 3,135,488 | 6/1964 | Leonard | 248/50 |
| 3,568,964 | 3/1971 | Perkins | 248/229 X |
| 4,771,743 | 9/1988 | McDowell | |
| 4,827,654 | 5/1989 | Roberts | 248/514 X |
| 5,022,104 | 6/1991 | Miller | 248/558 X |
| 5,058,838 | 10/1991 | Velke, Sr. et al. | 248/68.1 X |

FOREIGN PATENT DOCUMENTS

| 2626197 | 12/1976 | Fed. Rep. of Germany | 248/73 |
| 3608295 | 9/1986 | Fed. Rep. of Germany | 248/73 |
| 2005758 | 4/1979 | United Kingdom | . |
| 1545781 | 5/1979 | United Kingdom | . |

Primary Examiner—Karen J. Chotkowski
Attorney, Agent, or Firm—Davis, Bujold & Streck

[57] ABSTRACT

A cord clamp has relatively rotatable annular members locatable in at least three relative orientations. Therefore, the mounting angle of the annular members, for example, onto the inside of a cabinet can be adjusted in a wide range, thus increasing work efficiency and improving usage. In addition the cord clamp has a retainer for releasably locking the annular members together and preventing the annular members from being released unexpectedly. Thus, the cord clamp secure the holding or gripping of a cord.

14 Claims, 18 Drawing Sheets

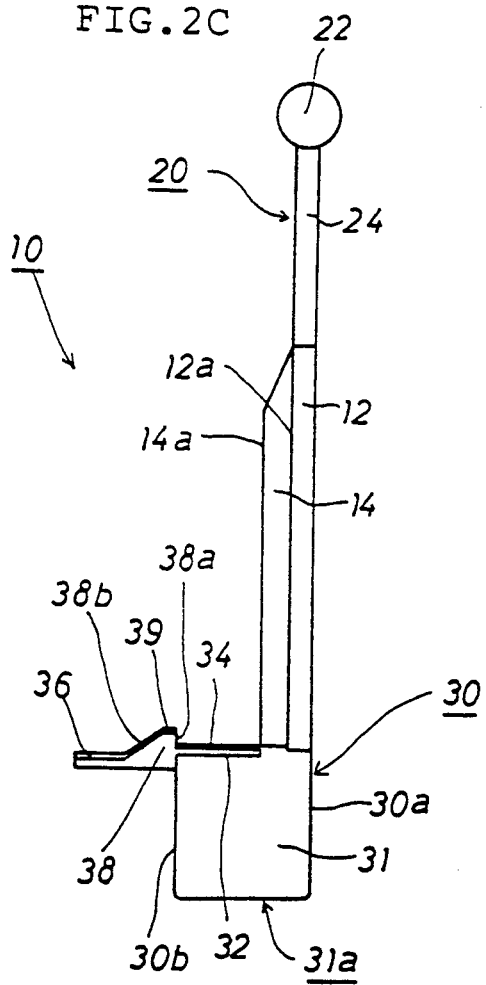

FIG.2F
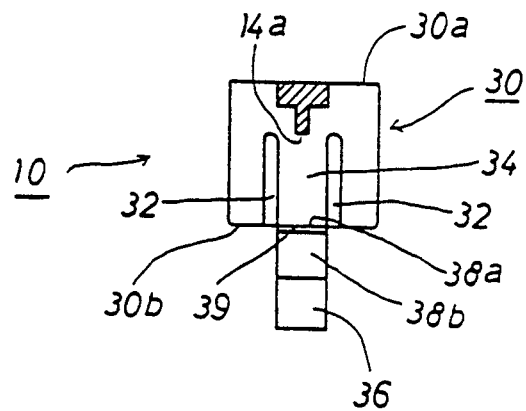
FIG.2D
FIG.2G
FIG.2E
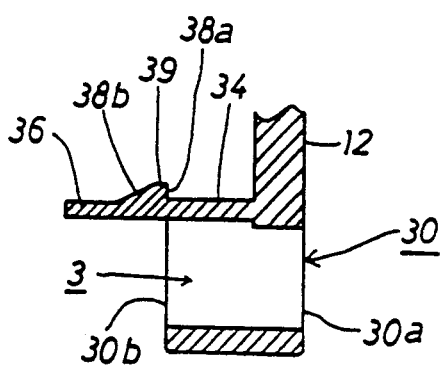
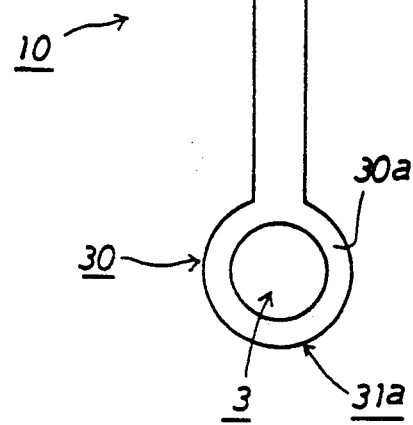
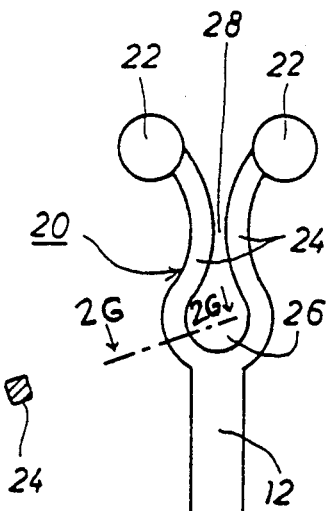

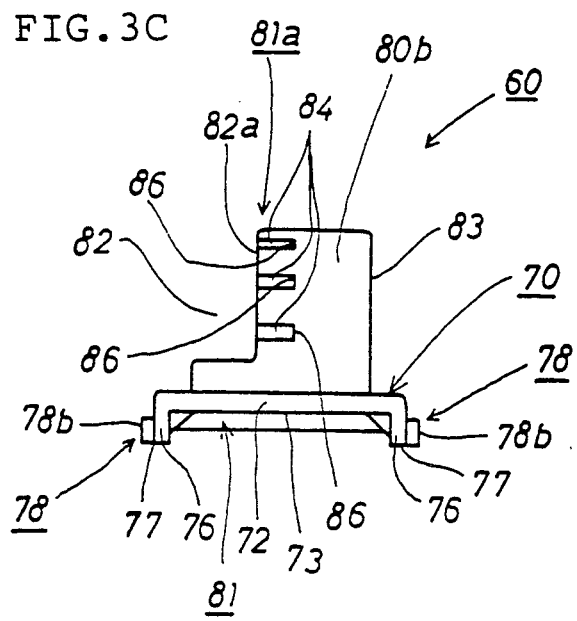
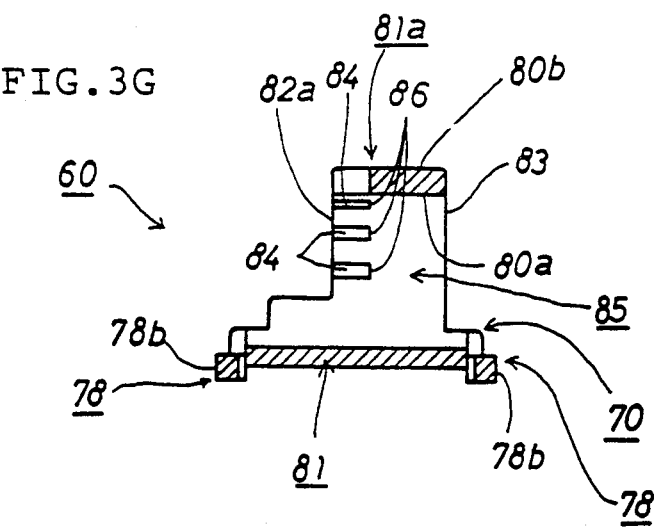

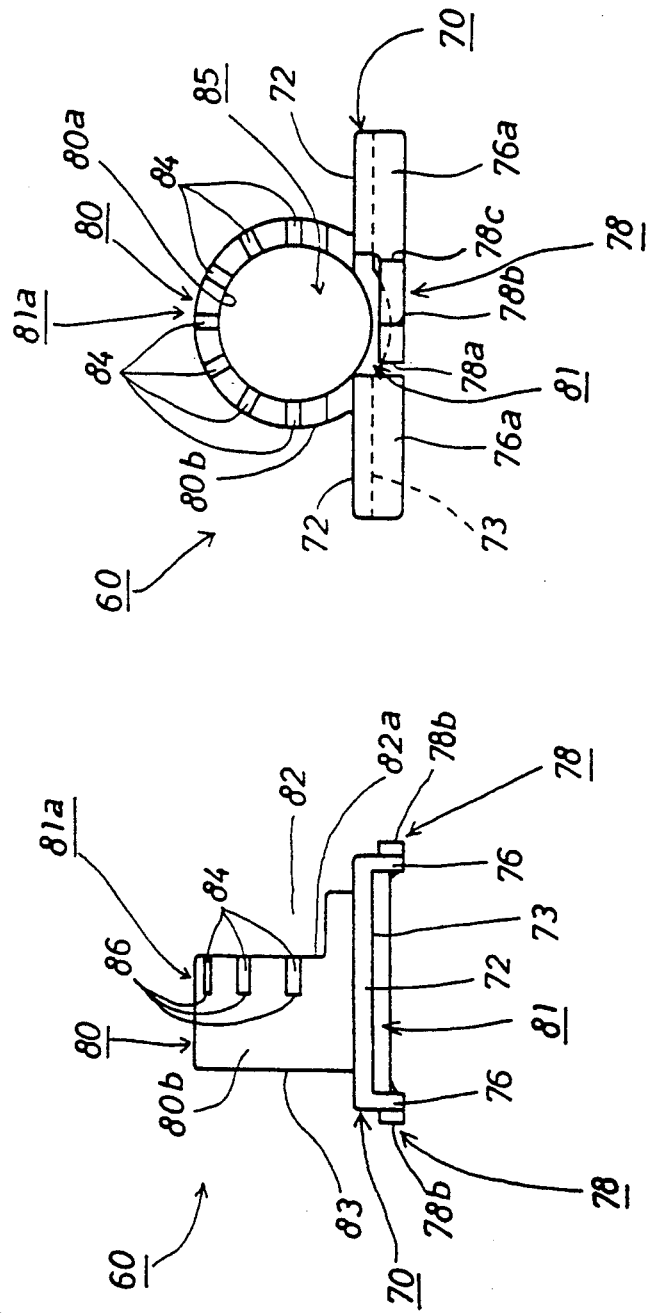

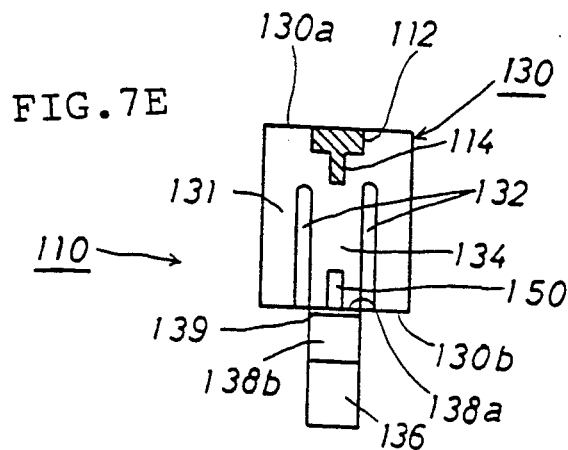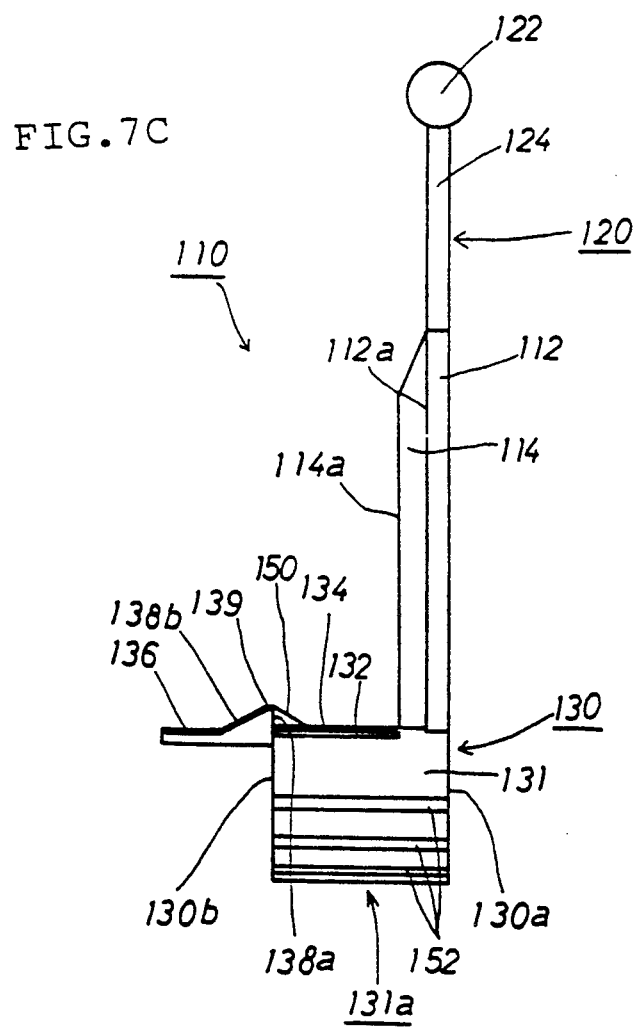

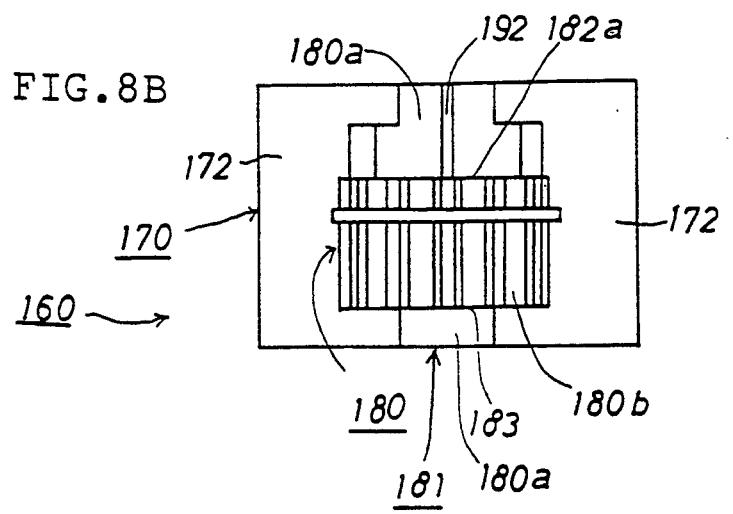
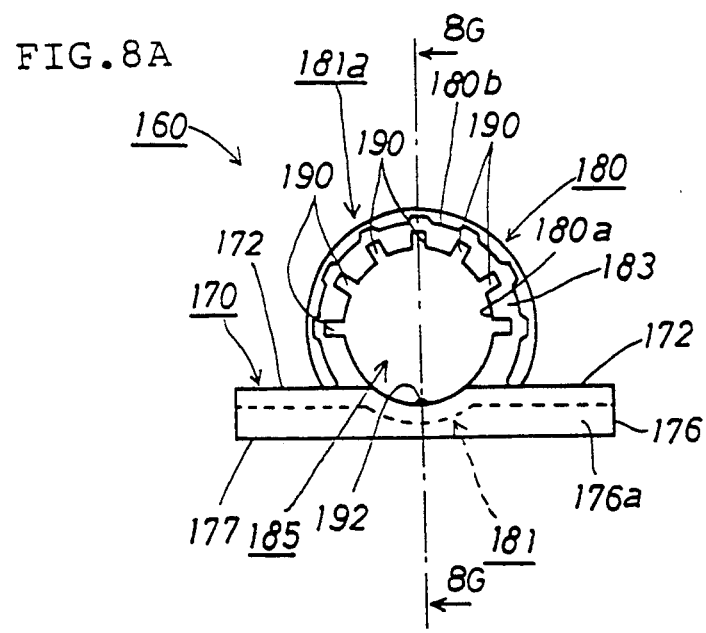
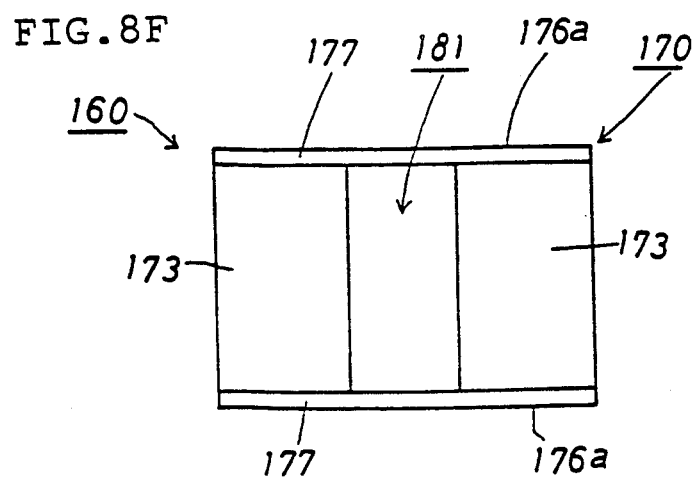

CORD CLAMP

BACKGROUND OF THE INVENTION

This invention relates to a cord clamp for holding or gripping a cord.

Conventionally, a cord clamp comprises an arm member having a cord holding portion at an end of the arm member. The arm member can swivel or be locked in two positions within its swiveling range. For example, according to a cord clamp indicated in Japan Published Unexamined Utility Model Application No.1-22082, the arm member swivels 90 degrees about its axis when one end of the arm member is fixed at a right angle on a surface of a cabinet or the like. The arm member can be locked in two positions approximately vertical to the fixing portion.

However, in the conventional cord clamp, the arm member can be locked only in two positions. The cord clamp does not have enough range of adjustment of the arm member for fixing the cord clamp to, for example, the inner wall of a cabinet or the like. The cord clamp is thus inadequate in its action and use.

SUMMARY OF THE INVENTION

It is an object of the present invention is to provide a cord clamp with improved operation and usefulness wherein an arm member of the cord clamp can be locked in three or more positions.

To achieve the above object, a cord clamp of the present invention comprises an attachment member, for attachment to an attachment surface, having an outer annulus forming either as a male annulus or a female annulus, and a movable arm member having a first and a second end having an inner annulus forming the other of either a male annulus or a female annulus at said first end, and a cord holding member at said second end, stop structures provided on both the outer annulus and the inner annulus for preventing the inner annulus from revolving in the outer annulus selectively at at least three engaging positions, and patching structures provided on the outer annulus and the inner annulus for cooperation such that the inner annulus detachably engages with the outer annulus axially thereof.

BRIEF DESCRIPTION OF THE DRAWINGS

The invention will now be described, by way of example, with reference to the accompanying drawings, in which:

FIG. 2C is a side view and FIG. 2D is a rear view of the clamp member 10 of the first embodiment;

FIG. 2E is a cross sectional view taken along line 2E—2E of FIG. 2A;

FIG. 2F is a cross-sectional view taken along line 2F—2F of FIG. 2A;

FIG. 2G is a cross-sectional view taken along line 2G—2G of FIG. 2D;

FIG. 3C is a left side view, FIG. 3D is a right side view, FIG. 3E is a rear view.

FIG. 3G is a cross-sectional view taken along line 3G—3G of FIG. 3A;

FIG. 7B is a plan view and FIG. 7C is a side view of a clamp member 110 of the cord clamp of the second embodiment;

FIG. 7E is a cross-sectional view taken along line 7E—7E of FIG. 7A; and

FIG. 8A is a front view, FIG. 8B is a plan view, FIG. 8F is a reverse view of a base member 60 of the second embodiment and FIG. 8G is a cross-sectional view taken along line 8G—8G of FIG. 8A.

DETAILED DESCRIPTION OF THE PREFERRED EMBODIMENTS

Figure 1:
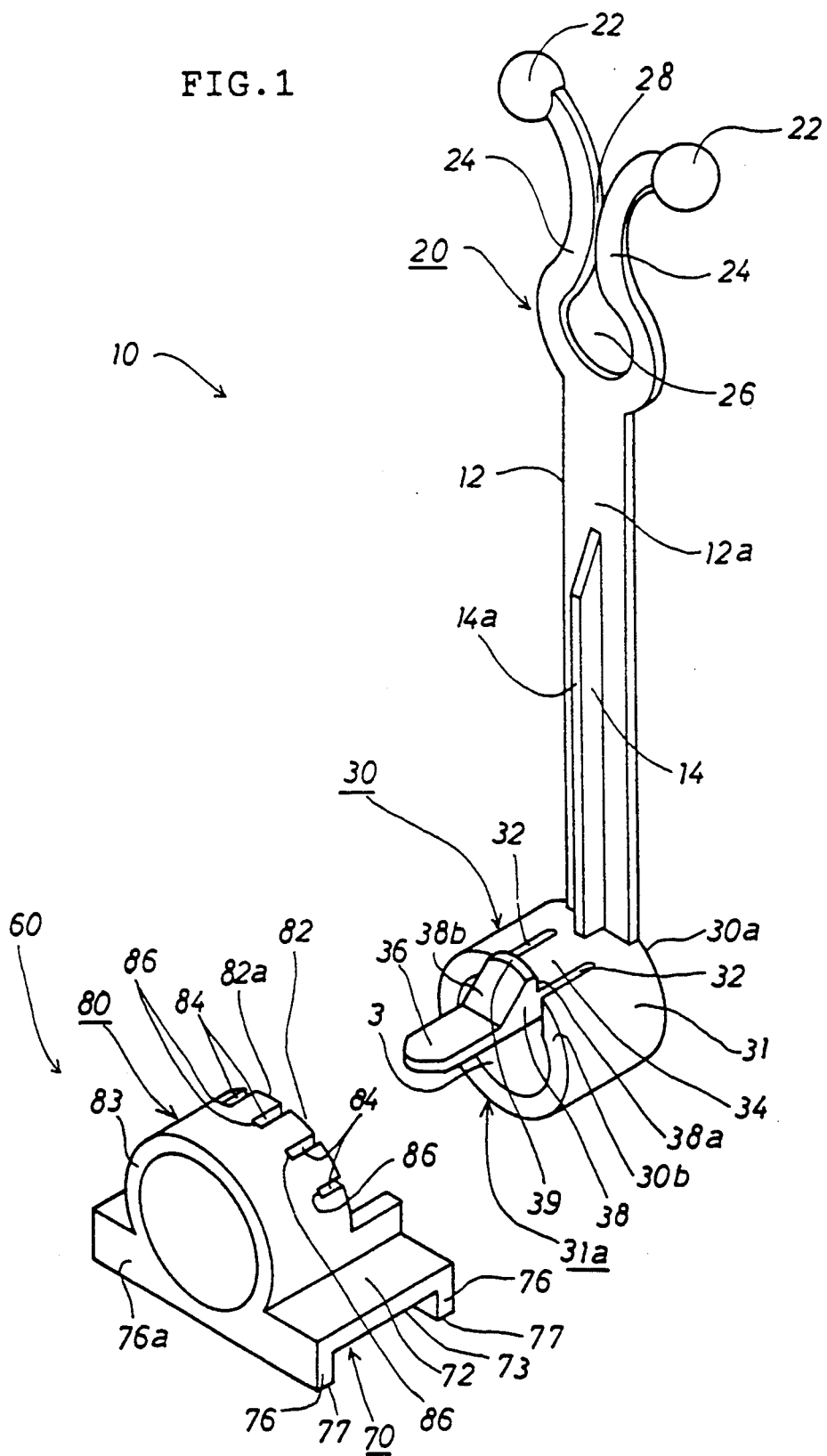
FIG. 1 is a schematic perspective view of a cord clamp of a first embodiment.
Figure 2B:
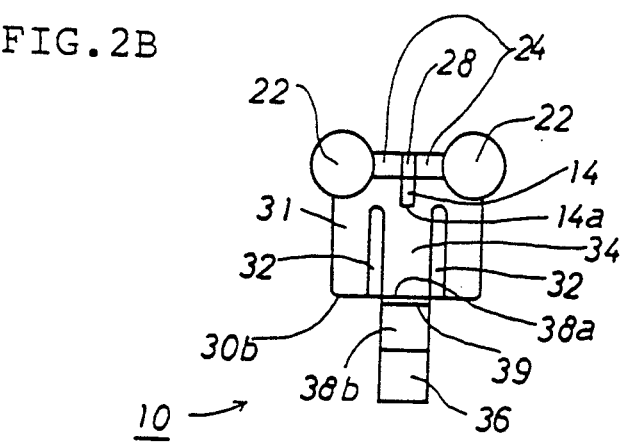
FIG. 2B is a plan view.
Figure 2A:
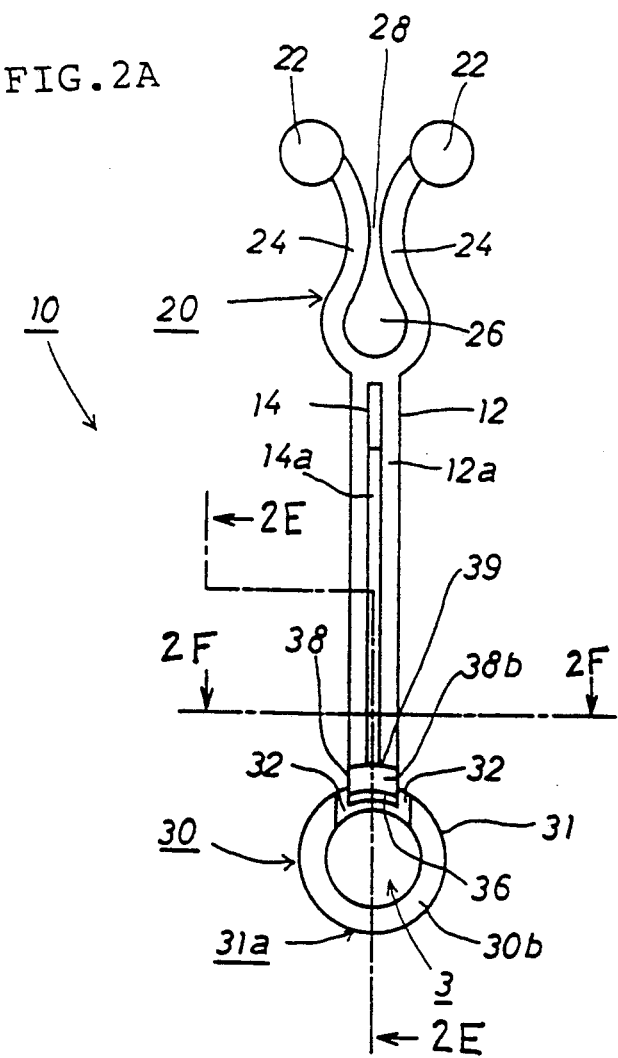
FIG. 2A is a front view.
Figure 3B:
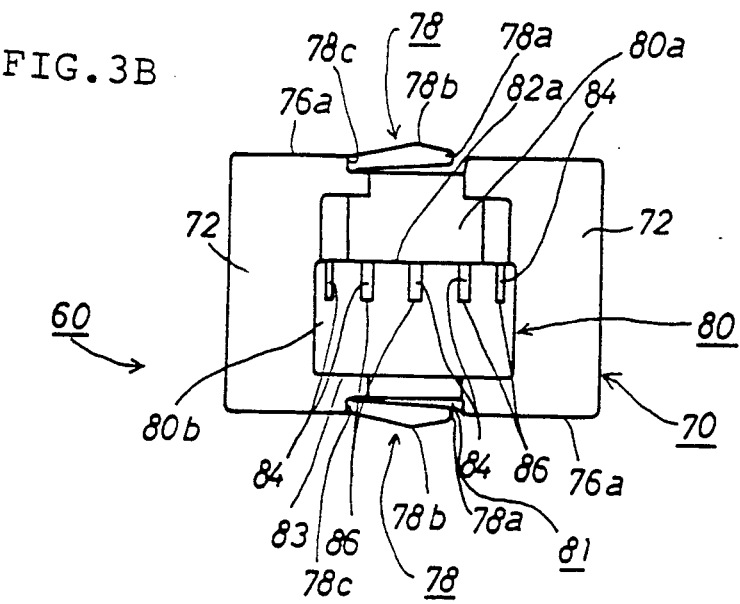
FIG. 3B is a plan view.

FIG. 1 is a schematic perspective view of a cord clamp of the first embodiment of the present invention. As seen in FIG. 1, the cord clamp comprises a clamp member 10 and a base member 60. FIG. 2 shows six aspects of the clamp member 10 in detail. FIG. 3 shows six aspects of the base member 60 in detail. FIGS. 4A through 4C and FIG. 5 show the working condition of the cord clamp of the first embodiment.

The clamp member 10 is injection molded from nylon, and the base member 60 is injection molded from polyacetal. The clamp member 10 comprises a slender flat arm 12, a holding member 20 and an inner annulus 30. The holding member 20 is formed at the outer end of the arm 12 to hold a cord. The inner annulus 3, formed at the inner end of the arm 12 can engage a base member 60. The holding member 20 branches out and extends from the top of the arm 12 to globular ends 22. The distance between the globular ends 22 and 2 is approximately the same as the width of the arm 12. Holding arms 24 extend from the top of the arm 12 to the globular ends 22. The holding arms 24 are symmetrical with respect to the axis, and their configurations are approximately S-shaped. A dropped-shaped opening 26 is formed between and by the holding arms 24. At the top of the opening 26, the holding arms 24 are close to each other forming an inlet 28. A cord, wire or the like can be inserted into the holding hole 26 through the inlet 28, and held therein. Once a cord is held in the opening 26, the holding arms 24 are deformed to overlap one another so that the inlet 28 is closed. Thus, the cord, wire or the like held in the openings 26 is held capture in the opening 26.

On a flat surface 12a of the arm 12, an elongate flange 14 is formed in a longitudinal direction from the bottom edge of the arm 12 where the inner annulus 30 is attached. The length of the flange 14 is approximately two-thirds of the length of the arm 12. The flange 14 projects from the flat surface 12a of the arm 12. The height of the flange 14 is approximately two-thirds of the width of the arm 12.

The inner annulus 30 is shaped like a short tube. The arm 12 and flange 14 are connected with the periphery of one end 30a of the inner annulus 30, so that the arm 12 extends radially from the inner annulus 30 relative to the axis thereof. Two slots 32 are formed on the outer peripheral surface 31 of the inner annulus 30. The slots 32 penetrate from the outer peripheral surface 31 to the inside 3 of the inner annulus 30. A cantilever beam 34 is formed between the slots 32 with one end supported by the inner annulus 30. A free end 36 of the beam 34 extends axially from the end 30b of the inner annulus 30. The length of the end 36 is approximately the same as that of the beam 34. A patch 38 projects from the outer peripheral surface 31 of the beam at the end 30b. The patch 38 has a retaining surface 38a formed radially outwardly from the outer peripheral surface 31 facing the arm 12. A sloping surface 38b declines gently toward the edge of the end 36 from the retaining surface 38a. A top surface 39 of the patch 38 forms a curved surface.

The base member 60 comprises a base 70 and an outer annulus 80. The base 70 has a base member 72 provided with short legs 76. The cross-sectional configuration of the flat part 72 and the legs 76 is approximately square bracket-shaped. As seen in FIGS. 3A through 3G, at the middle part of the legs 76, grips 78 are provided (not shown in FIG. 1). The grips 78 project from the outer surface 76a and are hook-shaped. The grips comprises a bent portion 78b having a root 78c continuing to the leg 76 at one end, and a free end 78a.

Figure 3A:
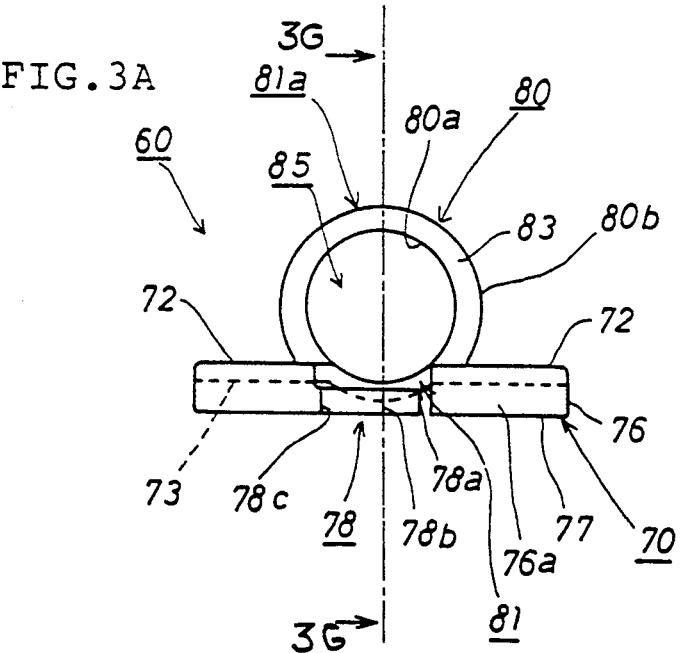
FIG. 3A is a front view.
Figure 3F:
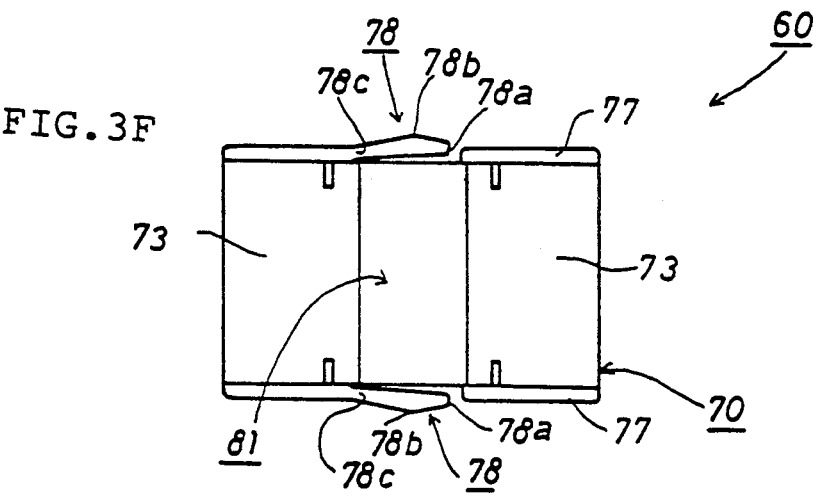
FIG. 3F is a reverse view of a base member 60 of the first embodiment.

A lower part 81 of the outer annulus 80 is connecting to the middle part of the flat part 72. The outer annulus 80 is shaped like a tube slightly larger than the inner annulus 30 of the clamp member 10. As seen in FIG. 3A and FIGS. 3C through 3G, the lower part 81 of the outer annulus 80 where the middle part of the flat part 72 connects to the outer annulus 80 is set lower than the bottom surface 73 of the flat part 72. Therefore, as seen in FIGS. 3A, 3E or 3F, the lower part 81 is sandwiched in the flat part 72. As seen in FIG. 3A or 3C, the lower part 81 is positioned adjacent to the grips 78 and 78.

An inner peripheral surface 80a of the outer annulus 80 has a large enough diameter such that the inner annulus 30 can revolve freely in the outer annulus 80. Approximately one-third of the outer annulus 80 is cut away thereby forming a recess 82. The distance between a front end surface 82a facing the recess 82 and a rear end surface 83 of the inner annulus 80 is approximately same as that between the flat surface 12a of the arm 12 and the retaining surface 38a (The latter distance could be a little longer than the former distance).

Seven axially extending slots 84 are formed in the front end surface 82a at regular intervals throughout half of the circumference of the outer annulus 80. The slots 84 penetrate the outer annulus 80 from the outer peripheral surface 80b to the inner peripheral surface 80a. The width of the slots 84 is not less than the thickness of the flange 14. The distance between the front end surface 82a and the deepest surface 86 of the slots 84 is not less than the with of the flange 14 between the flat surface 12a and the front edge 14a of the flange 14.

Hereinafter, the operation of the first embodiment as constructed above will be explained.

Figure 4C:
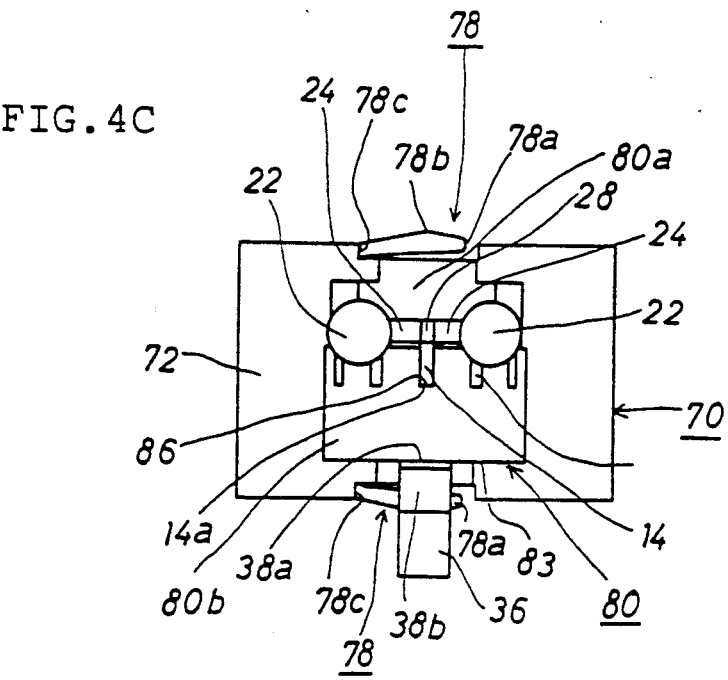
FIG. 4C is a plan view showing a working condition of the first embodiment.
Figure 4A:
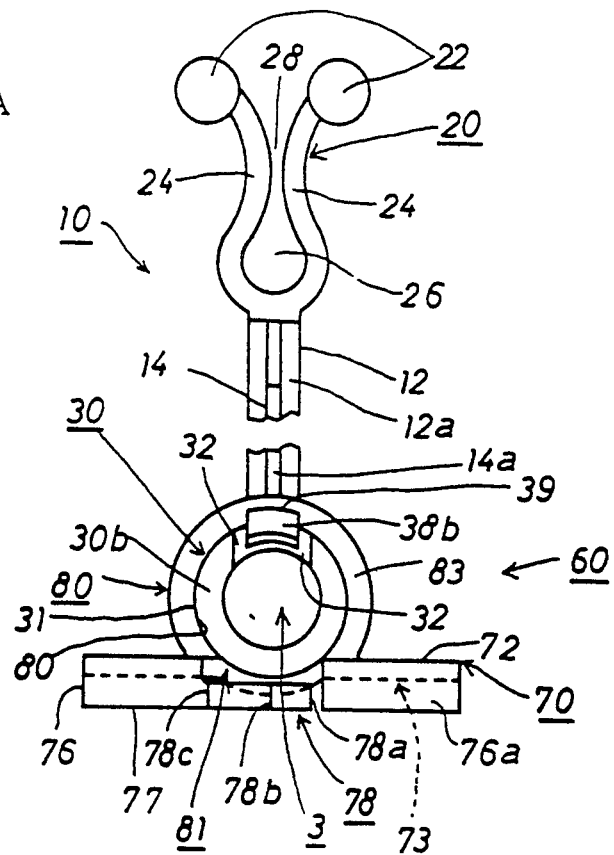
FIG. 4A is a front view.
Figure 4B:
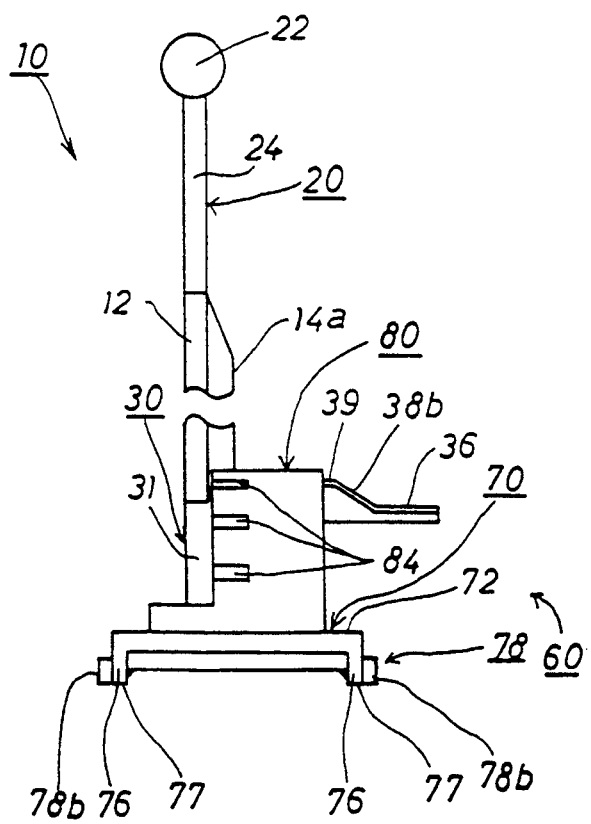
FIG. 4B is a side view.
Figure 5:
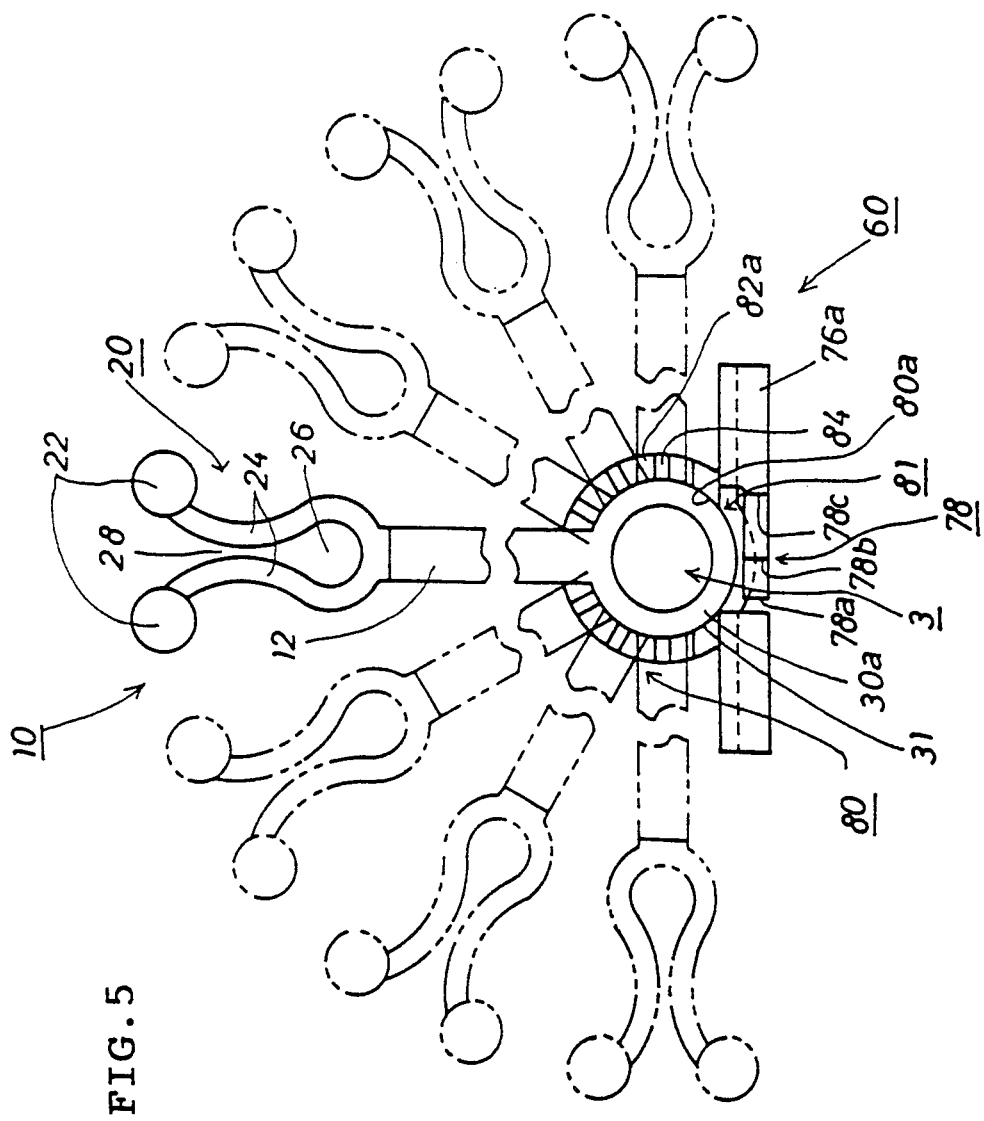
FIG. 5 is a explanatory view showing that the cord clamp of the first embodiment can select a desired position from seven engaging positions.

The base member 60 is firstly attached to an inner wall of a cabinet or the like. The base member 60 can be attached to any places such as a body of a car or the like where it is necessary to fix a cord clamp to hold a wire or a cable at a predetermined position. The method of the attachment is to attach the lower surface 73 of the flat part 72, or the base 77 of the leg 76 to the attachment surface, for example, by an adhesive. Double-coated tape, snap, surface fastener, screw or bolt and nut could be used for the attachment instead of an adhesive. As seen in FIGS. 4A through 4C, the inner annulus 30 of the clamp member 10 is engaged with the outer annulus 80 of the base member 60. As a first step of the engagement, the end 36 is inserted into an inside 85 of the outer annulus 80 followed by the inner annulus 30. Since the retaining portion 38 projects from the outer peripheral surface 31 of the inner annulus 30, the sloping surface 38b engages the inner peripheral surface 80a of the outer annulus 80, and the patch is thereby pressed down to the inside 3 of the inner annulus 30. The beam 34 is thereby resiliently deformed. The top surface 39 slides along the inner surface 80a in the axial direction. Then, the front edge 14a of the flange 14 reaches the front surface 82a. At this time, the inner annulus 30 is rotated in the outer annulus 80 to select one of the seven slot 84, and the flange 14 enters into the chosen slot 84. The inner annulus 30 is further inserted into the outer annulus 80 until the flat surface 12a of the arm 12 reaches the front surface 82a of the outer annulus 80. Since the distance between the front surface 82a and the rear surface 83 is approximately same as that between the flat surface 12a and the retaining surface 38a (The latter distance could be slightly longer than the former distance.), the retaining surface 38a, upon release of the tension of the deformed beam 34, moves outwardly to engage the rear surface 83 when the flat surface 12a reaches to the front surface 82a. The beam 34 reverts to its original position. The retaining surface 38a engages surface 83, so that the inner annulus 30 is held in place within the inside 85 of the outer annulus 80.

The method of taking the inner annulus 30 out of the outer annulus 80 is to press the end 36 down against the resilience of the beam 34, and push the retaining portion 38 into the inside 3 of the inner annulus 30. The annulus 30 can then be removed from the inside 85 of the outer annulus 80.

According to the above embodiment described, the cord clamp can select from among seven engaging positions only by operating the end 36 by pressure. Therefore, The holding member 20 provided at the top of the clamp member 10 can engage selectively at the seven positions. A wire, cord or the like held in the holding member 20 can be held and supported at seven positions by the arm 12 to the attachment surface where the base member 60 is attached to. Specifically, the cord clamp of this invention has flexibility in engaging angle of the arm to the attachment surface of the cord clamp in the cabinet or the like, thereby enhancing the working efficiency and the usefulness of the cord clamp Moreover, provided with the retaining portion 38 and the beam 34 which can deform downward only by a little pressure, the cord clamp can engage and disengage the inner annulus 30 and the outer annulus 80. The cord clamp is thus significant as to usefulness.

With this construction the clamp member 10 and the base member 60 engage with each other tightly. The arm 12 is engaged securely at the selected engaging position to the attachment surface of the base member 60, and a cord and a wire are held and fixed securely at the desired position.

Figure 6:
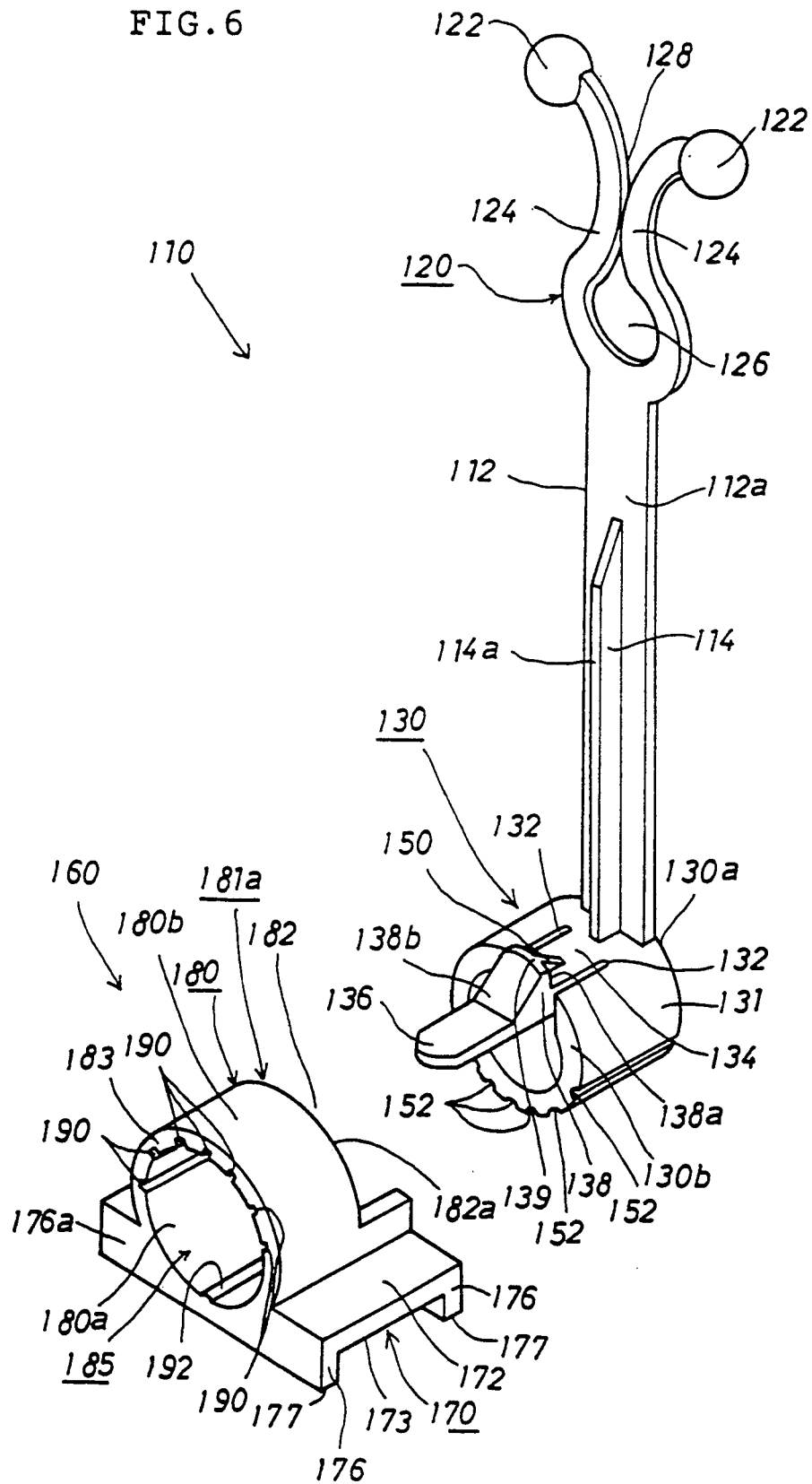
FIG. 6 is a schematic perspective view of a cord clamp of a second embodiment.
Figure 7B:
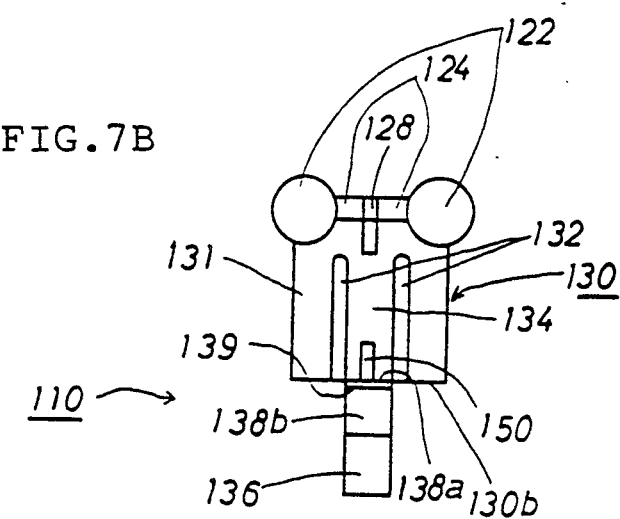
Figure 7A:
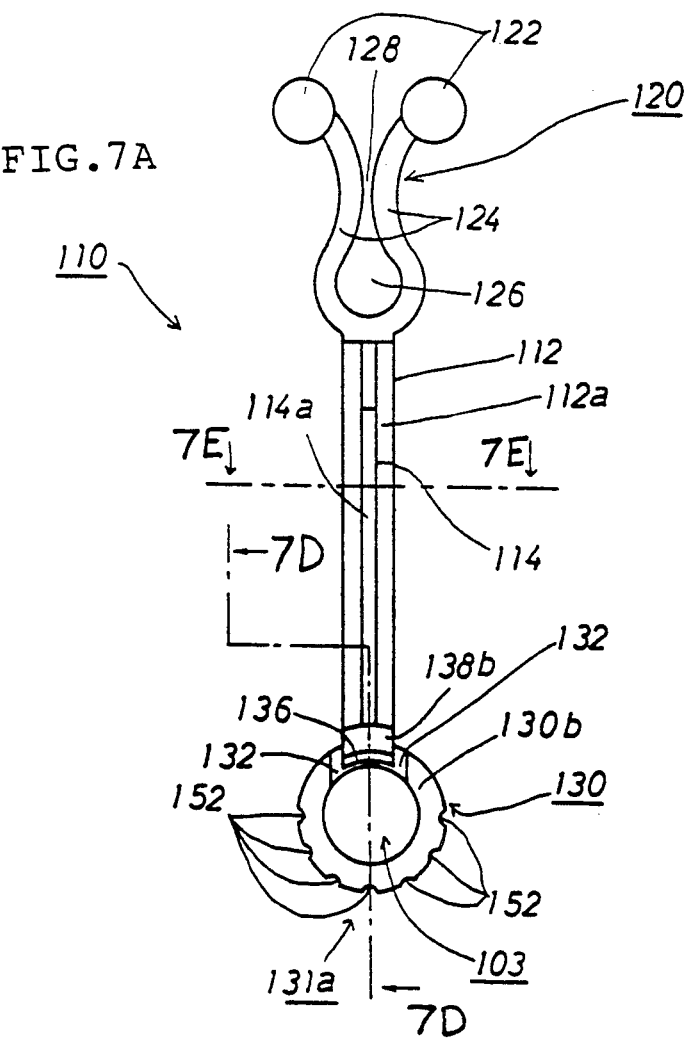
FIG. 7A is a front view.
Figure 7D:
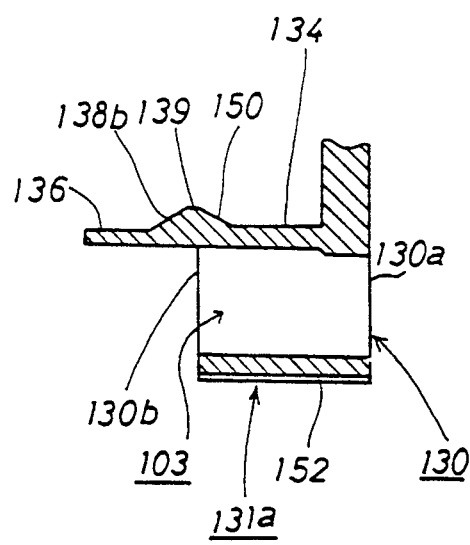
FIG. 7D is a cross-sectional view taken along line 7D—7D of FIG. 7A.
Figure 8C:
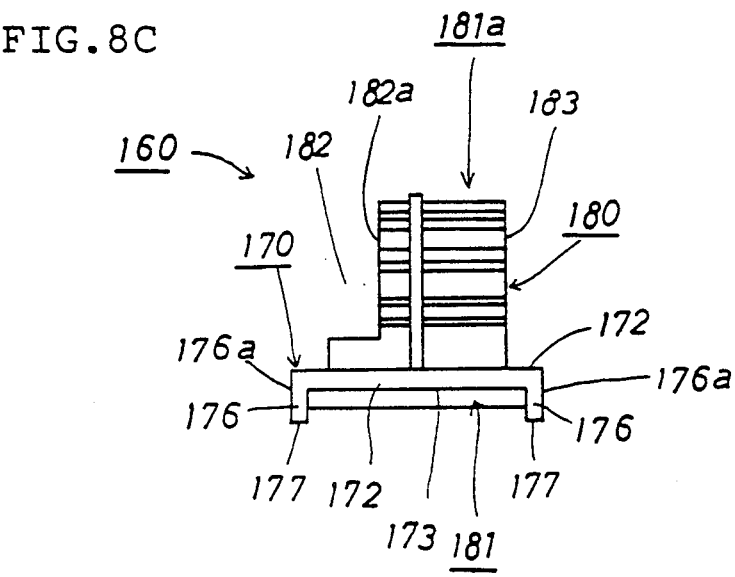
FIG. 8C is a left side view.
Figure 8G:
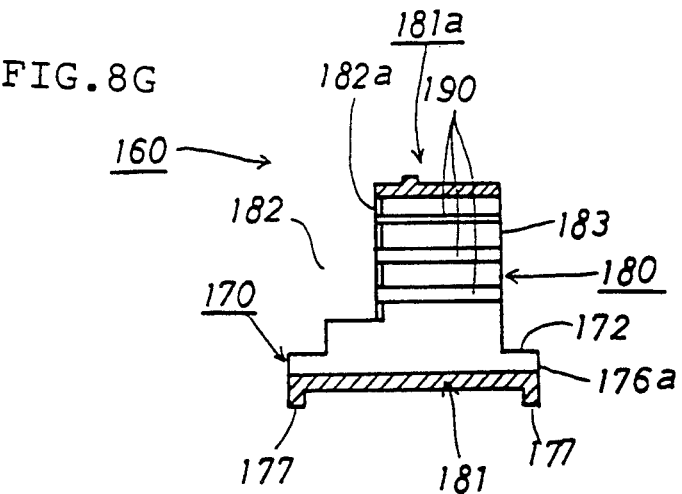
Figure 8D:
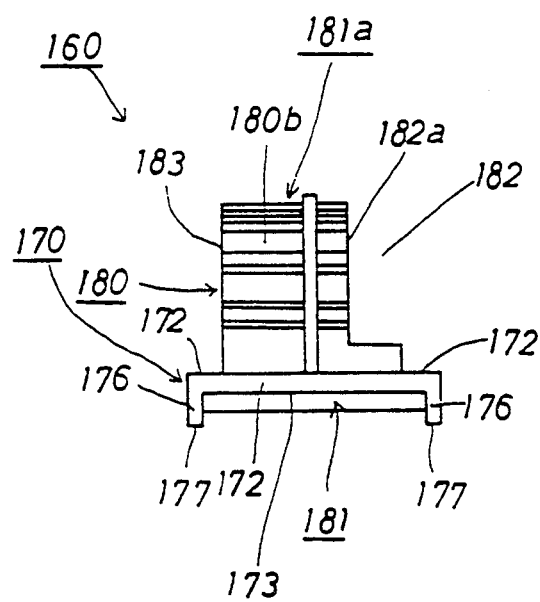
FIG. 8D is a right side view.
Figure 8E:
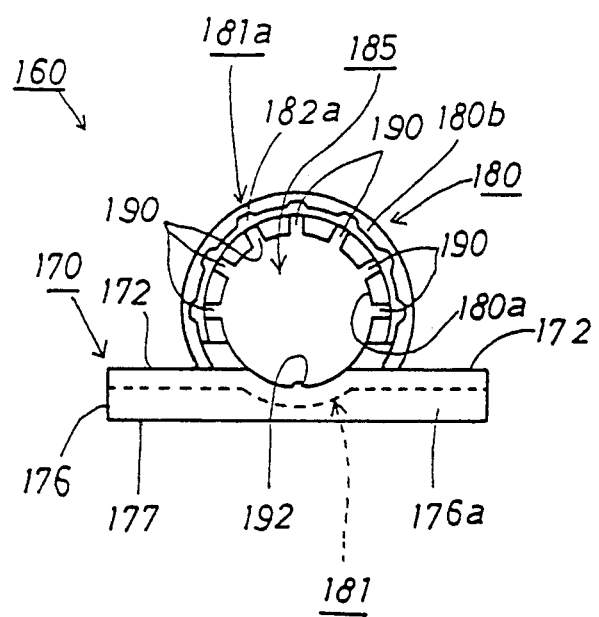
FIG. 8E is a rear view.

The second embodiment of this invention will now be explained with reference to the FIGS. 6 through 8. A cord clamp of this embodiment comprises a clamp member 110 and a base member 160. The six aspects of the clamp member 110 are shown in FIGS. 7A through 7E, and the six aspects of the base 160 are shown in FIGS. 8A through 8G. The exterior features on the outer peripheral surface of the base member 160 is omitted in FIG. 6.

The clamp member 110 is provided with an engaging protrusion 150. The engaging protrusion 150 is, as seen in FIG. 7C, formed from a top surface 139 of a patch 138 to a beam 134. The engaging protrusion 150 is narrow, and the configuration of its side is a right triangle. The engaging protrusion 150 slopes from approximately the middle par of the top surface 139 down to the upper surface of the beam 134. Specifically, the base of the engaging protrusion 150 is approximately one-third of the distance between a stopping surface 138a and a front edge 114a of a flange 114, its perpendicular line is as tall as a stopping surface 138a.

At a lower part 131a of an outer peripheral surface 131 of an inner annulus 130 of the clamp member 110, seven slender grooves 152 are provided at regular intervals circumventing the lower half of the inner annulus 130. The cross-sectional configuration of the slender grooves 152 is a semicircle. The slender grooves 152 are formed on the outer peripheral surface 131 from the end 130a to the end 130b. On an inner peripheral surface 180a of the outer annulus 180 of this embodiment, seven engaging grooves 190 are provided. The engaging grooves 190, formed from the end 182a to the end 183, are shallow, narrow and long. The engaging grooves 190 are provided at regular intervals circumventing the upper half 181a of the inner peripheral surface 180a. The width of the engaging grooves 190 is approximately the same as the width of the engaging protrusion 150 (or is slightly wider). The depth of the engaging grooves 190 is deep enough to engage with the engaging protrusion 150 to prevent the inner annulus from revolving. When the inner annulus 130 engages with the outer annulus 180 completely, and a retaining surface 138a engages rear surface 183.

At the lowest portion of the inner peripheral surface 180a of a lower part 181 of the outer annulus 180, a protrusion 192 is provided. The cross-sectional configuration of the protrusion 192 is approximately a semicircle. The protrusion 192 is formed from the end 182a to the end 183. The protrusion 192 is wide and high enough to fit in the slender grove 152 gently when the inner annulus 130 is inserted into the outer annulus 180. The protrusion 192 engages with one of the slender grooves 152, when the engaging protrusion 150 engages one of the engaging grooves 190. Moreover, the distance between a front edge 114a of the flange 114 of the clamp member 110 and the retaining surface 138a is approximately the same as that between the end 182a and the end 183 of the base member 160 (or the former distance could be slightly longer than the latter distance).

In the second embodiment, before inserting the inner annulus 130 into the outer annulus 180 the inner annulus 130 is rotated to select the engaging groove 190 to be engaged by the engaging protrusion 150. When the selected engaging groove 190 faces the engaging protrusion 150, the inner annulus 130 is inserted into the outer annulus 180 until the engagement is complete. When an engaging groove 190 faces the engaging protrusion 150, the protrusion 192 will engage with a slender groove 152. When the engagement is completed and a retaining surface 138a connects with the end surface 183, the engaging protrusion 150 engages with the engaging groove 190. Thereby, the inner annulus 130 is prevented from rotating in the outer annulus 180. In addition, when the retaining surface 138a engages the end 183, the front edge 114a of the flange 114 engages the end 182a. Therefore, the inner annulus 130 in the outer annulus 180 locked in the axial direction, and the clamp member 110 engages with the base member 160 tightly.

It will be appreciated that certain features of the first and second embodiments could be combined to produce further embodiments without departing from the present invention.

What is claimed is:

1. A cord clamp comprising an attachment member, for attachment to a support structure, having a first annular member,
   a cord clamp member, defining first and second ends, having a second annular member at the first end and a cord holding member at the second end, the second annular member being of a size and shape to fit within the first annular member,
   the first and second annular members together defining interengaging means for adjusting the relative orientations of the first and second annular members to at least three fixed orientations,
   releasable retaining means, having a retaining surface, for releasably retaining the attachment and cord clamp members in engagement with one another, a portion of said releasable retaining means being resiliently displaceable in a substantially radially inward direction of the second annular member,
   an arm extending radial outward of the second annular member and interconnecting the cord holding member with the second annular member, and
   once the first and second annular members are engaged with one another, the first annular member being located between the retaining surface of said releasable retaining means and said arm thereby to prevent the cord clamp member from being disengaged from said first annular member.

2. A cord clamp according to claim 1, wherein the first annular member defines a cylindrical bore to closely accommodate a cylindrical outer surface of the second annular member therein.

3. A cord clamp according to claim 2, wherein the interengaging means comprises a locating flange extending from an outer periphery of the second annular member and a plurality of slots in the first annular member each capable of accommodating the flange to locate the members in the desired one of the at least three fixed orientations.

4. A cord clamp according to claim 3, wherein there are seven of the slots.

5. A cord clamp according to claim 3, wherein the releasable retaining means comprises a cantilever spring, formed by two slots, extending longitudinally of the second annular member to a ramp supporting the retaining surface for engaging an end of the first annular member, when the second annular member is fully inserted therein with the flange engaging one of the slots, the ramp being positioned and oriented to facilitate said insertion.

6. A cord clamp according to claim 2, wherein the interengaging means comprises a plurality of grooves extending longitudinally in an outer perimeter of the second annular member and a corresponding rib extending longitudinally on the cylindrical bore of the first annular member for cooperation with one of the grooves to locate the members in the desired one of the at least three fixed orientations.

7. A cord clamp according to claim 6 in which there are seven of the grooves.

8. A cord clamp according to claim 1, wherein the arm is an elongate member extending from the second annular member to the cord holding member.

9. A cord clamp comprising an attachment member, for attachment to a support structure, having a first annular member,
- a cord clamp member, defining first and second ends, having a second annular member at the first end and a cord holding member at the second end, the second annular member being of a size and shape to fit within the first annular member,
- the first annular member defining a cylindrical bore for closely accommodating a cylindrical outer surface of the second annular member therein,
- the first and second annular members together defining interengaging means for adjusting the relative orientations of the first and second annular members to at least three fixed orientations, the interengaging means comprising a plurality of grooves extending longitudinally in an outer perimeter of the second annular member and a corresponding rib extending longitudinally on the cylindrical bore of the first annular member for cooperation with one of the grooves to locate the first and second annular members in a desired one of the at least three fixed orientations, and
- releasably retaining means for releasable retaining the attachment and cord clamp members in engagement with one another,
- wherein the releasable retaining means comprises a cantilever spring, formed by two slots, extending longitudinally of the second annular member to a ramp and retaining surface for engaging an end of the first annular member when the second annular member is fully inserted therein, the ramp being positioned and oriented to facilitate said insertion.

10. A cord clamp according to claim 9 in which a tapering flange extends longitudinally of the second annular member, this tapering flange being supported by the cantilever spring on the cylindrical outer surface of the second annular member and a plurality of slots extend longitudinally on the cylindrical bore of the first annular member to be engaged by the tapering flange when the second annular member is fully inserted into the first annular member.

11. A cord clamp comprising an attachment member, for attachment to a support structure, having a first annular member,
- a cord clamp member, defining first and second ends, having a second annular member at the first end and a cord holding member at the second end, the second annular member being of a size and shape to fit within the first annular member,
- the first and second annular members together defining interengaging means for adjusting the relative orientations of the first and second annular members to at least three fixed orientations.
- releasably retaining means for releasable retaining the attachment and cord clamp members in engagement with one another, said releasable retaining means comprising a resilient cantilevered beam member having a first end supported by said cord clamp member and having an opposite second end resiliently displaceable in a radially inward direction of the second annular member, when the second annular member is being fitted within the first annular member, the second end of the cantilevered beam member returning substantially to its undisplaced position once the second annular member is fully inserted within the first annular member to achieve the releasable engagement.

12. A cord clamp according to claim 11, wherein the cord clamp member comprises an arm which interconnects a first axial end of the second annular member with the cord holding member and the cantilevered beam member extends axially from a second opposite axial end of the second annular member.

13. A cord clamp according to claim 11, wherein the first annular member defines a cylindrical bore for closely accommodating a cylindrical outer surface of the second annular member therein, and the interengaging means comprises a locating flange extending from an outer periphery of the second annular member and a plurality of slots in the first annular member each capable of accommodating the locating flange to locate the first and second annular members in a desired one of the at least three fixed orientations.

14. A cord clamp according to claim 11, wherein the first annular member defines a cylindrical bore for closely accommodating a cylindrical outer surface of the second annular member therein, and the interengaging means comprises a plurality of grooves extending longitudinally in an outer perimeter of the second annular member and a corresponding rib extending longitudinally on the cylindrical bore of the first annular member for cooperation with one of the grooves to locate the first and second annular members in the desired one of the at least three fixed orientations.

* * * * *